United States Patent [19]

Barry

[11] Patent Number: 4,653,002

[45] Date of Patent: Mar. 24, 1987

[54] NAVIGATION SYSTEM FOR UNMANNED VEHICLES

[75] Inventor: Robert F. Barry, Monroeville Boro, Pa.

[73] Assignee: Westinghouse Electric Corp., Pittsburgh, Pa.

[21] Appl. No.: 654,691

[22] Filed: Sep. 26, 1984

[51] Int. Cl.[4] .......................... G06F 15/50; B62D 1/02
[52] U.S. Cl. ..................................... 364/424; 180/167; 364/460; 340/942
[58] Field of Search ............... 364/424, 436, 443, 460; 340/825.31, 825.36, 541, 555, 556, 557, 910, 942; 246/29 R; 180/167, 168, 169

[56] References Cited

U.S. PATENT DOCUMENTS

| | | | |
|---|---|---|---|
| 2,581,552 | 1/1952 | O'Hagan | 340/942 |
| 2,996,137 | 8/1961 | Chu et al. | 180/168 |
| 3,147,817 | 9/1964 | De Liban | 180/82 |
| 3,365,572 | 1/1968 | Strauss | 246/29 R |
| 3,411,603 | 11/1968 | Kohls | 180/98 |
| 3,570,227 | 3/1971 | Bellinger | 56/25.4 |
| 3,642,087 | 2/1972 | Sampey | 180/98 |
| 3,691,368 | 9/1972 | Hoyler | 246/29 R |
| 3,725,699 | 4/1973 | Pascoe | 246/29 R |
| 3,744,586 | 1/1973 | Leinauer | 180/79.1 |
| 3,924,107 | 12/1975 | Sakai | 364/424 |
| 3,933,099 | 1/1976 | Sieb | 104/88 |
| 4,003,445 | 1/1977 | De Bruine | 180/98 |
| 4,028,533 | 6/1977 | Matsubara | 235/151 |
| 4,099,591 | 7/1978 | Carr | 180/98 |
| 4,151,526 | 4/1979 | Hinachi et al. | 343/7 VM |
| 4,272,762 | 6/1981 | Geller et al. | 340/556 |
| 4,278,142 | 7/1981 | Kono | 180/168 |
| 4,284,160 | 8/1981 | Deliban et al. | 180/168 |
| 4,309,758 | 1/1982 | Halsall et al. | 364/424 |
| 4,328,545 | 5/1982 | Halsall et al. | 364/424 |
| 4,413,210 | 11/1983 | Gronau | 318/16 |
| 4,498,075 | 2/1985 | Gaudio | 340/825.36 X |

Primary Examiner—Gary Chin
Assistant Examiner—Thomas G. Black
Attorney, Agent, or Firm—Daniel C. Abeles

[57] ABSTRACT

A system for effecting transport over a surface among a plurality of terminals, including at least one transport vehicle movable over the surface, light barriers dividing the surface into a plurality of contiguous elemental zones and sensing the passage of a vehicle across a boundary between two contiguous zones, light signal generators for emitting light signals identifying each zone occupied by a vehicle and identifying the location of each terminal, logic circuitry connected between the barriers and said light signal generators for controlling the light signals identifying each zone in response to passage of a vehicle across a boundary, a photoelectric receiver carried by the vehicle for sensing light signals produced by the light signal generators and producing electrical signals representative of the light signals, and a vehicle movement control circuit carried by the vehicle and connected to receive the electrical signals from the photoelectric receiver for controlling the movement of the vehicle in dependence on the light signals.

9 Claims, 15 Drawing Figures

→ t

NAVIGATION SYSTEM FOR UNMANNED VEHICLES

BACKGROUND OF THE INVENTION

The present invention relates to a navigation system for controlling the travel of unmanned, self-propelled vehicles across a surface among a plurality of terminals.

In many industrial or commercial installations, it is necessary to transport materials, personnel, tools, or machines from a starting location to a selected destination location. For such purposes, the exact route followed by the transport vehicle is not of importance. It is of importance, however, that a transport vehicle not collide with another transport vehicle or with a fixed obstacle along the travel route. It is additionally desirable that any personnel present in the travel area not be struck by a transport vehicle.

SUMMARY OF THE INVENTION

It is an object of the present invention to provide a system which permits a plurality of such vehicles to travel, with self guidance, across a surface to individual destination locations.

Another object of the invention is to provide unmanned, self-propelled transport vehicles with navigation information without requiring the transmission of electrical signals, by any means, to the vehicle during its travel.

Another object of the invention is to reduce to a negligible level the risk of collision of a vehicle with another vehicle, an obstacle in the travel area or personnel.

Another object of the invention is to limit the travel of such vehicles to permitted routes.

A further object of the invention is to provide a navigation control system which is electrically independent of each transport vehicle.

Yet another object of the invention is to make the operating state of the system visible to human observers.

A still further object of the invention is to make possible rearrangements of the configuration of the area over which vehicles may travel without requiring redesign of the vehicle controls.

Still another object of the invention is to permit a substantial number of vehicles to travel over the area at the same time.

These and other objects are achieved, according to the present invention, by a system for effecting transport over a surface among a plurality of terminals, which system includes at least one transport vehicle movable over the surface; barrier means for dividing the surface into a plurality of contiguous elemental zones and for sensing the passage of a vehicle across a boundary between two contiguous zones; light signal generator means for emitting light signals identifying each zone occupied by a vehicle and identifying the location of each terminal; circuit means connected between the barrier means and the light signal generator means for controlling the light signals identifying each zone in response to passage of a vehicle across a boundary; first photoelectric receiver means carried by the vehicle for sensing light signals produced by the light signal generator means and producing electrical signals representation of the light signals; and vehicle movement control means carried by the vehicle and connected to receive the electrical signals from the photoelectric receiver means for controlling the movement of the vehicle in dependence on the light signals.

It will be noted that the invention provides a solution to the problem of guiding one or more transport vehicles over a given surface area to selected destination locations, but that this invention does not address the problem of bringing a vehicle to a precisely defined position for docking. Once a vehicle has reached the destination zone in a system according to the invention, subsequent docking can be effected manually by operating personnel at that location, or automatically by known systems which do not form a part of this invention.

An unmanned, self-propelled, or autonomous, vehicle is one which is capable of movement under its own power and of making certain elementary decisions while enroute. Such a vehicle thus differs from a remotely controlled vehicle whose travel is controlled by an operator or automatic system at some distance from the vehicle and in communication with the vehicle. An autonomous vehicle is also to be distinguished from a vehicle which is guided along tracks or marked paths.

In contrast to remote controlled or guided vehicles, autonomous vehicles of the type described above offer a number of advantages, including elimination of the need to install rails or otherwise establish guide paths, elimination of the need for a remote control operator, and elimination of the need for supplying guidance signals to the vehicle from some remote location.

According to the invention, all guidance and collision and hazard avoidance information is provided to each vehicle by stationary light sources which communicate with each vehicle only via their light beams, and by stationary light barriers which monitor the movement of vehicles over the area to obtain information for controlling the navigation control light beams.

The system according to the invention enables the area over which vehicles are permitted to travel to be readily designated so as to prevent the vehicles from colliding with obstacles or entering an area which is otherwise unsafe, in that it contains, for example, a trench. Moreover, by simply repositioning supports carrying the navigation control light beams, a given area can be adapted to any changes in location of hazards, without requiring redesign of the control components provided on the vehicle. Thus, a vehicle need not be provided with detailed information regarding permitted travel routes, and will receive this information, while enroute, from the stationary light sources.

DESCRIPTION OF THE PREFERRED EMBODIMENTS

Figure 1:
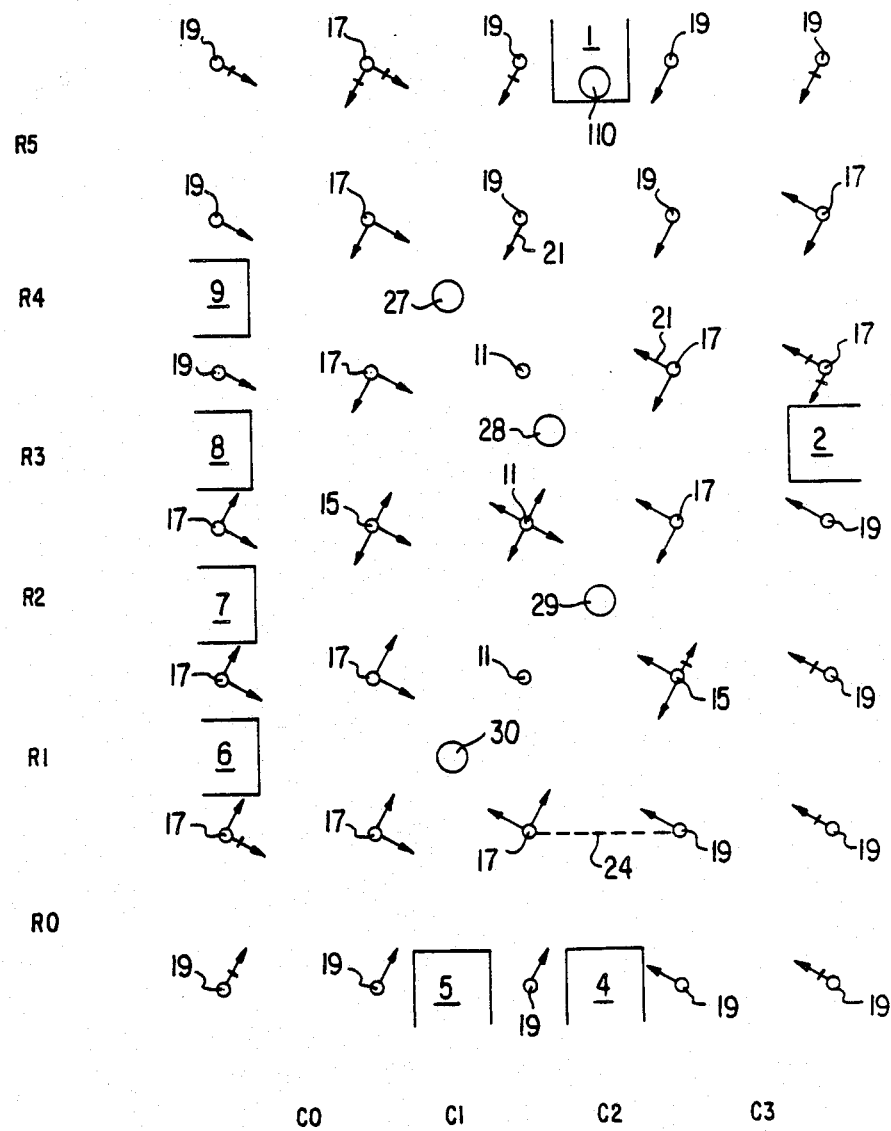
FIG. 1 is a pictorial plan view of an area equipped with a navigation control system according to the invention.

FIG. 1 is a simplified pictorial plan view of the stationary components of a navigation system according to the invention for controlling the movement of vehicles over a floor or ground surface among a group of loading docks 1, 2, 4, 5, 6, 7, 8 and 9. The navigation system includes an array of zone admission light supports 11, 15, 17 and 19 arranged, in the illustrated embodiment, in a rectangular grid pattern to delineate an array of square zones, with each zone having a light support at each corner thereof.

Each light support carries between 1 and 4 light sources, with each source producing a directed light beam having a beam axis 21. As is illustrated, each support 11 carries four such light sources oriented so that their beam axes are angularly spaced apart by 90°. Each support 15 carries three such light sources and each support 17 carries two such light sources. In the case of supports 15 and 17, the axes of the beams produced by the light sources are also angularly spaced apart by 90°. Each support 19 carries a single light source producing a single directed beam.

Each side of each square zone is further associated with a light barrier 24, only one of which is shown, in broken lines, in FIG. 1, for the sake of simplicity. Each light barrier can be constituted, in a known manner, of a source of a collimated light beam carried by one light support and a photocell aligned with that beam and carried by a support at the other end of the associated zone edge.

In accordance with one embodiment of the invention, the system further includes additional navigation lights 27, 28, 29 and 30 which may be mounted on separate supports or may be suspended above the ground, or floor, area. Lights 27–30 may be disposed wherever required and are constructed to emit light in all directions to serve as navigation beacons. However, according to another embodiment of the invention, the lights carried by supports 11, 15, 17 and 19 are operated to control zone admission and to provide navigation information, in which case additional navigation lights 27–30 would not be required.

Each light barrier 24 is electrically associated with the zone admission light sources whose beam axes are directed toward the zone edge associated with that light barrier. Thus, by way of example, the barrier 24 which is illustrated in FIG. 1 will be electrically associated with the light source carried by the support 19 which is located between docks 4 and 5 and with that light source which is carried by the support 15 immediately above and to the right of light barrier 24 and whose beam axis is directed toward that barrier 24. The manner in which each of those light sources is controlled when the light barrier 24 is interrupted and then restored will depend on the direction of movement of the vehicle which interrupts the light barrier, i.e. whether the vehicle is entering or leaving the zone with which that light source is associated.

Figure 2:
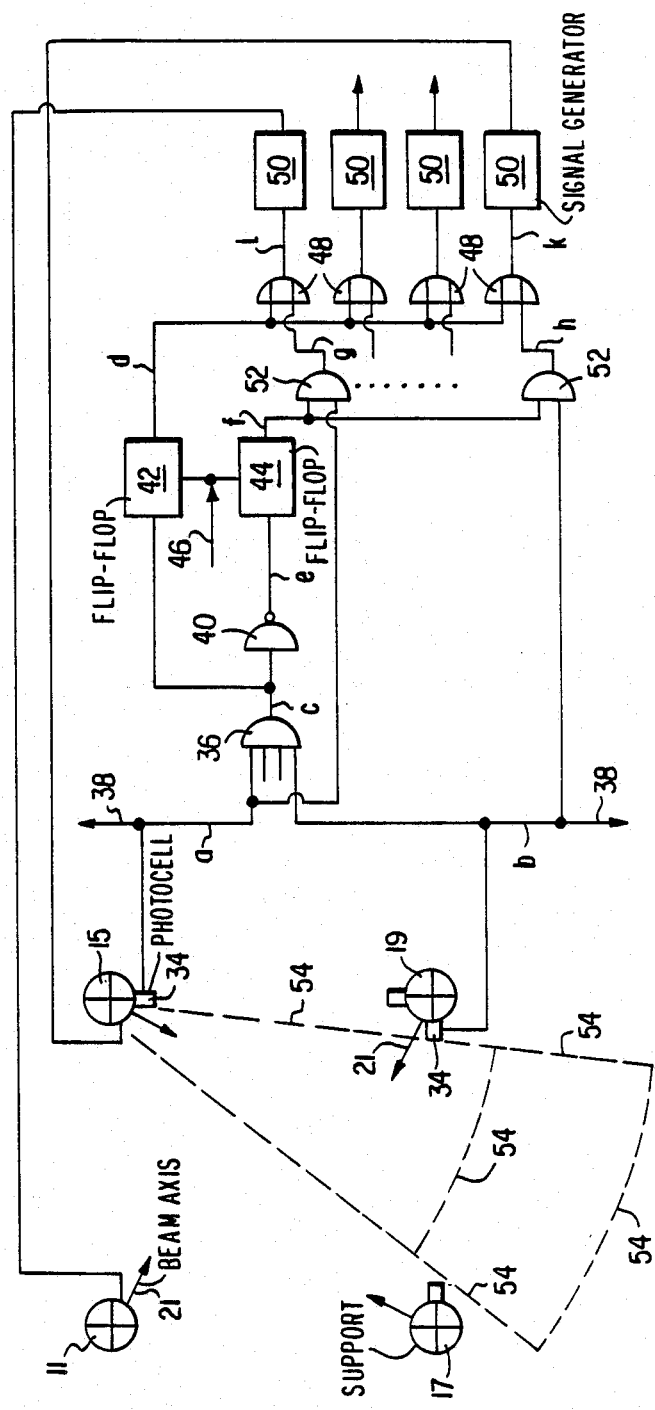
FIG. 2 is partly a pictorial view of a portion of the system of FIG. 1 and partly a block circuit diagram of a control circuit for the system.

FIG. 2 depicts the zone admission light supports, and two of the light barriers associated with a single zone. In the illustrated case, the zone is bounded by four different types of light source supports. However, each support is shown to be divided into four quadrants, with each quadrant being associated with a light source. In the case of support 19, there is only one light source associated with the single illustrated beam axis 21. FIG. 2 additionally illustrates a suitable logic circuit for controlling the light beams which monitor the boundaries of that zone. Each light barrier includes a receiver 34 producing an output signal which indicates whether the light beam associated with that barrier has been interrupted or not. Each receiver 34 associated with the given zone is connected to a respective input of an AND-gate 36. Since each light barrier is simultaneously associated with two zones, each receiver 34 will additionally be connected via a line 38 to a separate logic circuit arranged to control the light sources of the other associated zone. The logic circuit for each zone can be identical to that shown in FIG. 2.

Thus, AND-gate 36 has four inputs each connected to the receiver 34 of a respective one of the four light barriers associated with the illustrated zone. The output of gate 36 is connected to the input of an inverter 40 and to the signal input of a trigger flip-flop 42. The output of inverter 40 is connected to the input of a further trigger flip-flop 44.

Each of trigger flip-flops 42 and 44 is constructed to respond to each positive pulse edge at its input in order to assume an output state which is the complement of its previous output state.

In addition, each of the flip-flops 42 and 44 is connected to a line 46 to receive a setting signal which depends on whether, at the start of operation of the system, the associated zone is occupied by a vehicle or is vacant. The signal applied via line 46 sets the output of each flip-flop 42 and 44 to the logic "0" state if the associated zone is vacant, or to the logic "1" state if the associated zone is occupied by a vehicle.

The output of flip-flop 42 is connected to one input of each of four OR-gates 48. As will be explained, each of gates 48 is associated with a respective one of the light sources monitoring the associated zone. The output of each OR-gate 48 is connected to a respective signal generator 50 whose output is, in turn, connected to control a respective light source. The connections of the outputs of two of the signal generators 50 are illustrated.

The output of flip-flop 44 is connected to one input of each of four two-input AND-gates 52, only two of which are shown to simplify the illustration. The other input of each AND-gate 52 is connected to a respective receiver, or photocell, 34.

Each of the generators 50 is constructed in a conventional manner to cause its associated light source to produce a first type of signal when a positive signal is applied to the generator input and to cause its associated light source to produce a second type of signal when no signal is present at the generator input. The operation of the circuit will be described below with reference to the waveforms shown in FIGS. 3a–j. The location of each of the waveforms of FIGS. 3 is indicated in FIG. 2 by the reference letter of the associated one of FIGS. 3a–j. Each of FIGS. 3 is broken at the middle to indicate that the operating state associated with those signal values is of indeterminate length.

The waveforms shown in FIGS. 3 are based on the assumption that the zone shown in FIG. 2 is initially vacant, and a vehicle enters the zone via the right-hand boundary shortly after the beginning of the time period depicted and exits the zone via the lower boundary near the end of the period depicted. If the zone is initially occupied by a vehicle, then the operating sequence would begin with the circuit in the operating state depicted in the mid-region of the waveforms. In the illustrated embodiment, positive logic is assumed, with the output of each receiver 34 producing a logic "1" when the light barrier is uninterrupted and a logic "0" when the associated barrier is interrupted.

At the beginning of the sequence depicted in FIGS. 3, a vehicle entering the zone first interrupts the right-hand light barrier and after the vehicle has completely entered the zone, that light barrier is restored. The signal produced by the associated receiver 34 is depicted in FIG. 3a. When any of the four light barriers associated with the zone is interrupted, the output of AND-gate 36 assumes the logic "0" state, and the output of inverter 40 correspondingly assumes the logic "1" state. The output of gate 36 is shown in FIG. 3c, while that of inverter 40 is shown in FIG. 3e.

Figure 3A:
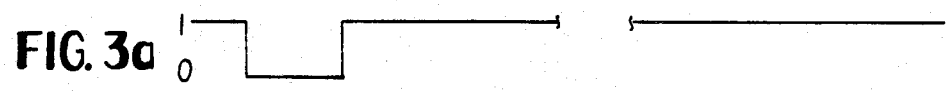
FIGS. 3a-3j are signal diagrams illustrating the operation of the circuit of FIG. 2.
Figure 3B:
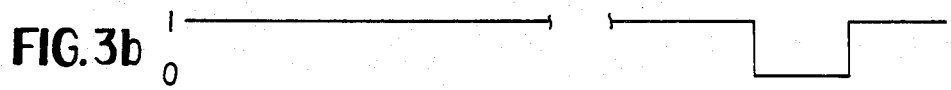
Figure 3C:
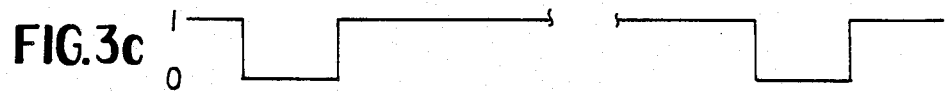
Figure 3D:
Figure 3E:
Figure 3F:

Thus, when any one of the light barriers associated with the zone is interrupted, the output state of flip-flop 42 remains unchanged, as shown in FIG. 3d, while that of flip-flop 44 is switched to the complement of its preceding state, as shown in FIG. 3f.

The output of flip-flop 42 is supplied to one input of each of the four OR-gates 48, while the output of flip-flop 44 is supplied to one of the inputs of each of AND-gates 52. The other input of each gate 52 is connected to the light receiver 34 associated with a respective one of the light barriers bounding the zone.

Figure 3G:
Figure 3H:
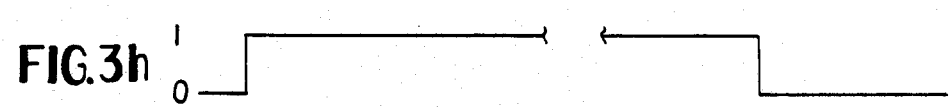

The waveform of the output thus appearing at the gate 52 associated with the light barrier which is initially interrupted is shown in FIG. 3g, while the waveform of the output of each of the other gates 52, associated with barriers that are not initially interrupted is shown in FIG. 3h.

Figure 3I:
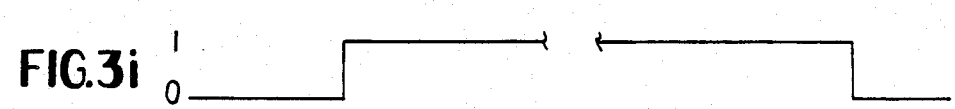
Figure 3J:

The output of each AND-gate 52 is connected to the other input of a respective one of the OR-gates 48. The resulting output of that gate 48 which is associated with the light barrier that was initially interrupted is shown in FIG. 3i, while the outputs of the other OR-gates 48 are depicted in FIG. 3j.

After the vehicle has completely entered the zone, so that the associated light barrier is restored, the output state of flip-flop 42 is switched, while that of flip-flop 44 remains unchanged.

Subsequently, when the vehicle exits the zone by traversing the lower light barrier, the output signal from that receiver 34 will have the form shown in FIG. 3b. When that light barrier is interrupted, the output state of flip-flop 44 switches, while that of flip-flop 42 remains unchanged. After the vehicle has completely left the zone, so that the light barrier is restored, the output of flip-flop 42 is switched, while that of flip-flop 44 remains unchanged.

Each generator 50 is constructed so that when the signal at its input has a logic "0" state, the generator output will cause its associated light source to produce a light signal indicating that the associated zone is vacant. When the input signal to a generator 50 has the logic "1" state, the generator output will cause the associated light source to produce a light signal indicating that the zone is occupied. Thus, as can be seen from FIGS. 2 and 3, when a vehicle entering the zone initially interrupts the right-hand light barrier, the light source on support 11 whose beam covers that boundary continues to produce a light signal indicating that the zone is vacant, so that the vehicle is permitted to continue entering the zone, while all of the other light sources produce light signals indicating that the zone is occupied, so that a vehicle approaching the zone from any other direction will be halted. After the vehicle has completely entered the zone, the signal applied to the light source on support 11 will also be switched to indicate that the zone is occupied, so that a following vehicle cannot enter the zone by passing through the right-hand boundary.

Subsequently, when the vehicle exits the zone, all of the light sources continue to produce light signals indicating that the zone is occupied until the vehicle has completely exited from the zone, i.e. until the lower light barrier has been restored. It will be seen that as the vehicle leaves one zone and enters the next zone, the light sources associated with the two zones will be independently controlled to provide the necessary light signals.

While the logic circuitry for controlling the light sources in a given zone has been illustrated in the form of a separate circuit for each zone, it will be appreciated that all the light receivers 34 and all of the light sources of the system can be connected to a single computer which is programmed to control each zone of the system in the manner described above.

FIG. 2 additionally illustrates, by means of broken lines, the area of coverage 54 of each navigational light beam. Generally, each beam is directed somewhat downwardly so that it can be "seen" by a photoreceiver on the vehicle within a region corresponding to more than one-half of the area of the zone which is adjacent to the zone with which the beam is associated and which is adjacent the zone boundary associated with that beam. This assures that the light sensor on a vehicle will not respond to zone admission light beams associated with remote zones or associated with the zone presently occupied by the vehicle.

Figure 4:
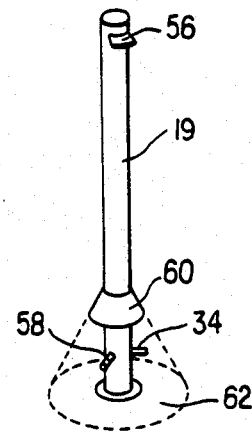
FIG. 4 is a perspective view of a component of the system of FIG. 1.

FIG. 4 shows, in perspective form, a suitable embodiment of a zone admission light support, a support 19, being shown. This support includes, near its top, a zone admission light beam source 56 positioned and oriented to produce a beam having the area 54 shown in FIG. 2. The beam produced by source 56 is inclined downwardly by a sufficient amount to be in the field of view of the light receiver of a vehicle which is located in the immediately adjacent zone, as described above.

Near its base, support 19 will be equipped with two light receivers 34 (only one of which is shown) and two light sources 58, each associated with a respective light barrier.

Furthermore, support 19 carries, at a location above the light barrier, a light source 60 producing a downwardly directed light cone 62 which will serve as a hazard warning light to signal a vehicle that it is approaching too close to a support. Such a hazard warning light can be provided on any other structure, such as the navigation lights 27-30, disposed in the vehicle travel area.

Supports 11, 15 and 17 could be constructed in a manner identical to that shown in FIG. 4, but with between two and four light beam sources 56 appropriately distributed around the circumference of the support.

Alternatively, all of the supports of a system according to the invention could be provided with four light beam sources, with those sources which are not required because of the particular location of the support simply being deactivated. This alternative would simplify rearranging supports when required.

Figure 5:
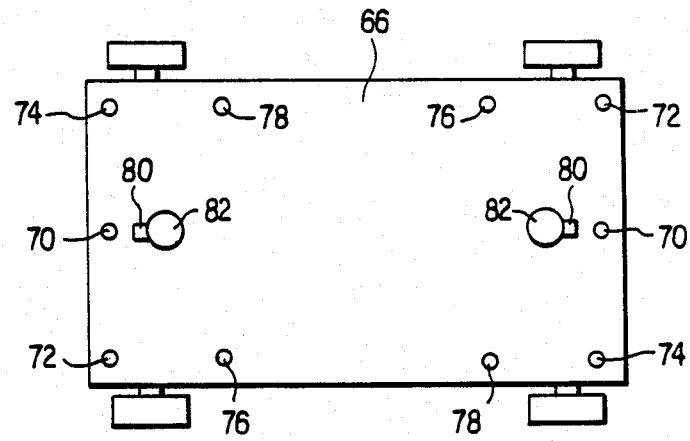
FIG. 5 is a plan view of a vehicle whose navigation is to be controlled by the system of FIG. 1.

FIG. 5 is a plan view showing an exemplary autonomous vehicle whose navigations is to be controlled in a system according to the present invention. Vehicle 66 includes, in addition to steerable front and rear wheels and a system for propelling the vehicle in either direction, upwardly directed light sensors 70, 72, 74, 76 and 78 which are oriented to receive only the light produced by sources 60, and two light sensors 80 which are each carried by a pivotable support 82 and which are oriented to receive light produced by sources 56 and the light radiation produced by navigation lights 27-30.

Light sensors 70-78 are connected to suitable circuitry, to be described below, which will appropriately control the steering and direction of travel of a vehicle after at least two of those sources have begun to receive light from a source 60. The sequence in which these sources begin to receive light will indicate the direction of movement of the vehicle relative to a support carrying source 60, and will thus provide information as to the maneuver which the vehicle should make in order to avoid the associated support.

More specifically, if vehicle 66 approaches a support 19 in such a manner that the sensor 70 at its leading end is the first to receive light, followed by the adjacent sensor 72, an indication is provided that vehicle 66 is heading almost directly toward the support. Under these circumstances, the sequence of signals provided by sources 70 and 72 will be converted into control signals which instruct the vehicle to first travel in the reverse direction for a short distance and to then resume traveling in the initial direction while turning a certain amount to the right. Correspondingly, if light begins to be received by sensors 70 and 74 in sequence, a similar operation will be effected, but the vehicle will be instructed to turn to the left after having traveled in the reverse direction and then resuming travel in its initial forward direction.

If sensor 72 should be actuated first, followed by sensor 70, this means that the center of the vehicle is heading slightly to the right of the support. In this case, the sequence of signals produced by the sensors can be utilized to instruct the vehicle to execute a sharp turn to the right in order to avoid the support, without executing a reversal in the direction of its travel.

If light is received first by sensor 72 and then by sensor 76, it is known that the vehicle heading is more oblique to its direction to support 19, in which case the signal sequence can instruct the vehicle to turn to the right by a lesser amount.

Finally, if light is received first by sensor 70 and then simultaneously by sensors 72 and 74, signifying that the vehicle is heading directly toward the support, the resulting signal sequence is utilized to cause the vehicle to travel in the reverse direction and to then travel forward while turning either to the left or right in accordance with a preselected convention.

The placement of sensors 70-78 on vehicle 66 can be determined on the basis of the distance, M, between a support and the periphery of its associated light cone 62. By way of example, each sensor 70 should be less than 0.7 M from each side of vehicle 66, each sensor 76 and 78 should be less than 0.7 M from its associated end and side edge of the vehicle, so that its distance from the closest corner of the vehicle is less than M, and any additional sensors behind 76 and 78 should be located less than M from the adjacent sensor and less than 0.7 M from the associated vehicle side edge.

As the vehicle travels over the floor area, the pivotal support 82 at the forward end of the vehicle can be continuously pivoted over a range extending 135°-150° to each side of the forward direction of travel so that the associated sensor 80 can scan for zone admission lights and navigation lights.

Figure 6:
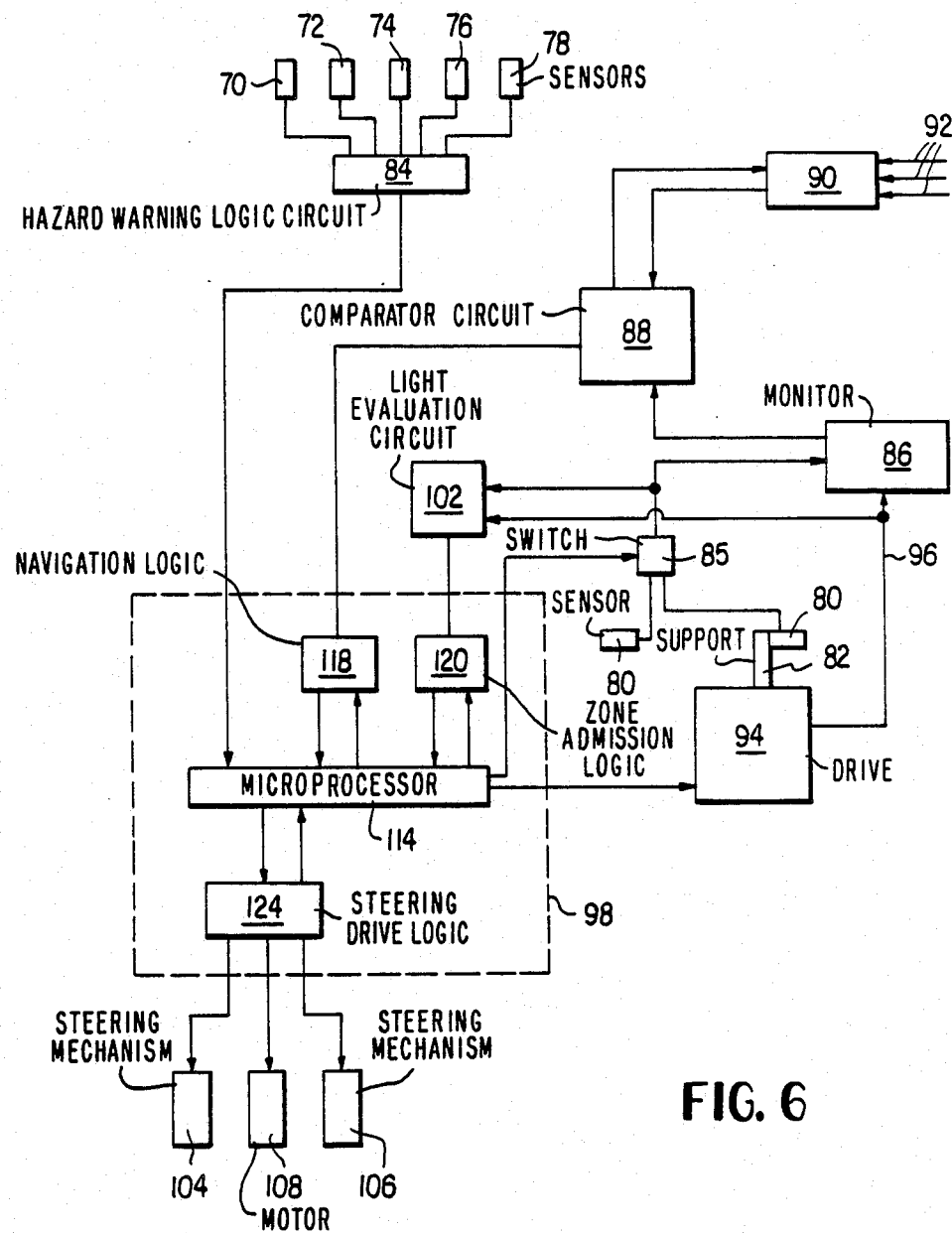
FIG. 6 is a block circuit diagram of a vehicle control apparatus carried by the vehicle of FIG. 5.

An exemplary embodiment of a vehicle movement control system mounted in vehicle 66 is shown in block form in FIG. 6. This system includes a hazard warning logic circuit 84 connected to all light sensors 70-78. Only the sensors located at one end of the vehicle are shown. However, the sensors located at the other end of the vehicle can be connected in parallel with the correspondingly numbered sensors shown in FIG. 6 since when a vehicle is traveling in a given direction, the sensors at the forward end of the vehicle, with respect to its current direction of movement, will always be the ones to come within a light cone 62.

Logic circuit 84 can be constituted by a microprocessor or a hard-wired logic circuit constructed to detect the sequence in which light sensors 70-78 enter a light cone in accordance with the relationships discussed above. The construction of such a logic circuit, or the programming of a microprocessor, would be readily apparent to those skilled in the art. When a particular sequence of light sensor activations has been detected, circuit 84 generates a characteristic signal, which can be in digital form, identifying the particular sequence detected. As long as sensors 70-78 do not detect light from the source 60, circuit 84 will produce no output signal, and will therefore not influence the operation of the vehicle.

In order to provide protection against activation by ambient light, the light produced by sources 60 can be given a particular pulse pattern, an on-off pattern at a selected frequency being suitable. In this case, circuit 84 will be constructed to respond only to signals at that frequency.

The two light sensors 80 are connected to a switch 85 which is controlled to pass signals only from the sensor at the forward end of the vehicle. The output of switch 85 is connected to a navigation light signal monitor 86, which monitors each light signal received by sensor 80. Monitor 86 includes components which provide an indication of the intensity of the output signal from sensor 80. Monitor 86 is constructed to compare successive occurrences of a given navigation light signal pattern as support 82 pivots in order to identify the maximum amplitude value, which occurs when the axis of the field of view of the operative sensor 80 is directed toward the corresponding navigation light.

Monitor 86 is connected to a comparator circuit 88 to supply representations of each navigation light signal for which a maximum has been identified by monitor 86.

Each of monitor 86 and circuit 88 can be provided with suitable digital sampling elements, memories and a suitably programmed microprocessor. As will be apparent from the description to be presented below, all of these components can be of a conventional nature.

Comparator circuit 88 is further connected to a programmable memory circuit 90 having programming inputs 92 that may be constructed to permit manual or electrical inputting. Programming inputs 92 are actuated to input into circuit 90, for storage, a representation of the light signal associated with the loading dock to which the vehicle is to travel. If the system includes separate navigation lights 27-30, memory circuit 90 will additionally be programmed to store representations of the pattern of the signals produced by each navigation light which is located along permitted paths between the vehicle starting point and the destination dock. Circuit 90 is further constructed to supply each stored representation in sequence to comparator circuit 88 in a certain priority order. By way of example, this priority order could be constituted by the signal pattern associated with the destination loading dock, followed by the signal pattern of each successive navigation light in the direction from the destination dock to the starting location of the vehicle. Each signal representation is supplied in turn from memory circuit 90 to comparator circuit 88 to be compared with each signal pattern provided by monitor 86 at the end of a scanning interval. If, during that interval, the first signal pattern supplied by memory 90 does not coincide with a signal pattern observed by monitor 86, comparator 88 signals memory 90 to deliver the next highest priority signal pattern. Thus, the system always seeks the signal pattern associated with the most remote location along the intended travel path of a vehicle before "looking" for the next closer navigation signal pattern.

During scanning, support 82 is rotated about a vertical axis by means of a drive device 94 which additionally continuously monitors the direction of the axis of the field of view of sensor 80 and produces a signal, on output line 96 connected to monitor 86, indicating the instantaneous angular position thereof relative to vehicle 66. This signal can be in digital or analog form and is associated in monitor 86 with a navigation signal for which a maximum is identified.

To prevent difficulties due to simultaneous reception of more than one navigation light signal, the following alternatives may be used, singly or in combination: each sensor 80 can be constructed to have a narrow field of view; monitor 86 can be constructed to employ correlation techniques to monitor only the first navigational signal pattern received until a maximum is identified, and to then begin to monitor a subsequently received pattern; the navigation sources can be controlled to emit their navigation light signal patterns in a sequence so that they do not overlap in time; all navigation signal lights can be constructed and oriented so that each light can be sensed over only a limited part of the total area, a slight amount of overlapping being permitted to assure that sensor 80 will always be in the range of one navigation light along the path of vehicle travel.

A vehicle control logic circuit 98 receives comparison signals and associated sensor angular position signals from comparator circuit 88 and a hazard warning signal from logic circuit 84.

The circuit arrangement further includes a zone admission light evaluation circuit 102 which is also connected to receive the signals passed by switch 85 and which is connected, in turn, to vehicle control logic circuit 98. As will be explained below, the light signal pattern indicating whether a particular zone is vacant or occupied will always have some characteristic which is detectably different from the navigational light signal patterns. Moreover, each zone admission light beam will impinge on a sensor 80 only when the associated vehicle is in a zone adjacent to that associated with a particular zone admission light beam.

Zone admission light evaluation circuit 102 can therefore be constructed in a simple manner to determine whether a zone admission light beam being sensed by sensor 80 is indicating that the associated zone is vacant or occupied. The resulting signal, which can be a simple two-level signal, is supplied to vehicle control logic circuit 98 to inform that circuit as to whether the zone which is adjacent the zone presently occupied by the vehicle and which is in the direction of the current field of view of sensor 80 is occupied or vacant.

Circuit 98 is further connected to device 94 to provide, if desired, signals instructing device 94 to cease pivoting support 82 or to resume such pivoting movement.

Vehicle control logic circuit 98 includes a series of output lines connected, respectively, to electrically controllable steering mechanisms 104 and 106, each of which steers the wheels at a respective end of vehicle 66, and to a drive motor 108 for propelling vehicle 66. Drive motor 108 may be permanently connected to both sets of vehicle wheels, by a suitable transmission, and may be rotatable in either direction. Alternatively, drive motor 108 can be selectively connected to only one set of wheels at a time, depending on the direction in which the vehicle is to be propelled.

According to the exemplary embodiment shown in FIG. 6, circuit 98 contains a microprocessor 114 constituting the central processing unit for the vehicle movement control ysstem. Microprocessor 114 is connected to receive signals from hazard warning logic circuit 84, and to exchange signals with a navigation logic 118, a zone admisson logic 120 and a steering/drive logic 124. Microprocessor 114 is further connected to supply switch control signals to switch 85 and drive control signals to drive device 94.

If a hazard warning signal is supplied by circuit 84, microprocessor 114 disables logics 118 and 120 until the appropriate hazard avoidance manouver has been executed. Similarly, microprocessor 114 may disable logic 120 while a navigation light signal is being acquired and may disable logic 118 while a zone admission light is being acquired.

Microprocessor 114 supplies steering and drive signals to logic 124 and can receive therefrom signals indicating that the desired manouver has been performed and/or indicating the distance traveled by the vehicle during a certain time period.

All of the circuits shown in FIG. 6, as well as mechanisms 104 and 106, motor 108, and the transmissions connecting motor 108 to the vehicle wheels may be constructed according to conventional techniques.

Among the many possible specific embodiments of the invention, two particular embodiments will be described: one in which the zone admission lights only provide an indication of whether their associated zone is vacant or occupied and all navigation is controlled by navigation lights, such as 27–30, and similar navigation lights, such as light 110, disposed at each loading dock 1, 2 and 4–9; and one in which all zone admission and navigation informaton is provided by the zone admission lights alone, in which case navigation lights 27–30 and 110 are not required. The first-mentioned embodiment is preferable for those installations in which, because the loading docks, or similar destination structures, will be moved from time to time or moveable obstacles will be present in the operating area, the available navigation paths will change. The second embodiment is preferable in a more permanent installation.

In the case of the first alternative mentioned above, each zone admission light can be controlled in a very simple manner to produce a continuous beam when its associated zone is vacant and a beam which is pulsed at a selected frequency when the associated zone is occupied. However, if it is desired to prevent the light sensors from producing false "zone vacant" signals in response to ambient light, each zone admission light can be controlled to produce light pulses at a first frequency if the associated zone is vacant and at a second frequency, preferably having a ratio of 1:3 to the first frequency, when the associated zone is occupied. According to another possibility, the zone admission light frequency can be kept constant, and the duration of each pulse can be varied. By way of example, if the associated zone is vacant, the zone admission light can have an on-off duration ratio of 2:1, while if the associated zone is occupied, the on-off ratio can be 1:2.

All of the navigation lights 27–30 and 110 are constructed to radiate their light signals in all directions and at an inclination to the horizontal so that such signals will be received by sensors 80 everywhere in the area covered by the navigation system, except for a region in the immediate vicinity of a respective navigation light or in a region where the line-of-sight between a sensor 80 and a navigation light is blocked by an obstacle. In that case, the navigation lights are positioned so that a vehicle always has line-of-sight communication with one of the navigation lights whose pattern is programmed into memory circuit 90.

Since vehicle 66 has two sensors 80, switch 85 is connected to receive a signal from logic circuit 98 to pass only the light sensor signals from that sensor 80 which is at the forward-traveling end of vehicle 66.

Each navigation light produces a characteristic light pulse sequence which can be preceded by an identification pulse sequence that informs monitor 86 of the start of a navigation light signal pulse sequence.

Preferably, navigation light pulse signals have some detectable characteristic which is clearly different from the zone admission light signals. By way of example, each navigation light sequence can be at a detectably different frequency or can be constituted by a detectably different pulse pattern. For example, each navigation light signal can be constituted by a particular pattern of short and long pulses separated by intervals such that the ratio of the duration of each pulse to the duration of the subsequent interval has a value of 1:1. However, this is only one exemplary possibility, and many other possibilities would be readily apparent to those familiar with digital signalling techniques.

The light pulse sequence associated with each navigation light could, by way of example, be based on the Morse code and could thus, in a simple manner, indicate whether the particular light beam is being emitted by a navigational signal light located within the area covered by the system or by a light associated with a particular loading dock. The light beam signal could then additionally identify the particular navigational light source.

A typical navigation procedure will now be described for a system in which navigation signals are provided by light sources separate from the zone admission light sources, with particular reference being made to FIGS. 1 and 6.

It should initially be noted that in the system depicted in FIG. 1, those zone admission light beams whose axes are provided with a hash-mark are permanently set to produce a "zone occupied" signal. This will reliably assure that vehicles do not travel out of the system. At the borders of the area, only those light beams which are associated with a zone containing a loading dock are controlled in accordance with the actual occupancy state of the associated zone. Each loading dock, 1, 2 and 4–9 is provided with a respective navigation light, identical to light 110 associated with dock 1. Each of those navigation lights, as well as each of navigation lights 27–30, is controlled to produce a characteristic light pulse pattern composed of a beginning light pulse sequence, which is the same for all navigation lights and then a pulse sequence which is characteristic of the particular navigation light.

At the start of the operation, all zone admission lights are set, in the manner described previously, to indicate whether the associated zone is initially occupied or vacant. It is assumed that a vehicle is initially present at dock 4 and is to travel to dock 8. At dock 4, the circuit 90 of the vehicle is programmed with the identifying pulse patterns of dock 8, navigation light 28 and navigation light 29, in such a manner that those pulse patterns will be examined in sequence in the order stated.

When programming has been completed, a signal can be supplied to instruct the vehicle to begin traveling away from dock 4. At this time, circuit 98 instructs the device 94 at the forward end of the vehicle to begin rotating support 82 in a manner to cause the associated sensor 80 to effect a continuous scanning movement extending over a range from 135° to the left of the vehicle axis to 135° to the right thereof. If sensor 80 receives a light pulse signal containing the identification pulse sequence identifying a navigation light signal, the intensity of that signal is monitored by monitor 86 and is subsequently compared with the intensity of the next occurrence of that signal. Each navigation light signal has a total sequence period which is short compared to the rate of scanning movement of light sensor 80. If the successive comparisons of a particular navigation light signal indicate that the light signal intensity is increasing, the scan is continued. If the intensity had been increasing but then begins to decrease, monitor 86 can instruct circuit 98 to halt the pivoting movement of support 82 so that the pattern being monitored is noted and temporarily stored together with a signal on line 96 identifying the corresponding angular position of the axis of the field of view of sensor 80. Alternatively, if a navigation signal pulse sequence is of sufficiently short duration, the sequence can be noted, when a maximum has been identified, and associated with the signal on line 96 without halting the scanning procedure.

After a maximum has been identified and stored in monitor 86, scanning can continue.

If a signal sequence supplied to monitor 86 continuously decreases in intensity from one measurement to the next, i.e. without passing through a maximum, scanning simply continues without that sequence being stored. Possibly, a maximum of that particular signal pattern will be identified during scanning in the other direction, i.e. from right to left.

After a complete scanning movement in one direction, or a scanning cycle consisting of a complete scan in both directions, the navigation light signal pattern or patterns for which maxima have been identified in circuit 86 are supplied in sequence to comparator circuit 88, each with the signal indicating the corresponding direction of the axis of the field of view of sensor 80.

Each such navigation light signal pattern is compared with the pattern, supplied by circuit 90, identifying dock 8. If no match is observed, all such light signal patterns are compared with the pattern identifying navigation light 28 and, if a match is still not observed, with the pattern identifying navigation light 29.

Thus, when a match is observed, it will always be with reference to the highest priority navigation light visible to sensor 80.

The system is constructed to assure that a vehicle within the controlled area can always "see" at least one navigation light whose pattern is stored in circuit 90. If no such pattern is observed scanning can be continued during a time period shorter than that needed to traverse a single zone, and if an appropriate navigation signal pattern has still not been observed, the vehicle can then be halted and caused to emit a visible or audible alarm, or circuit 98 can instruct the vehicle to continue to travel forward while being controlled by zone admission lights during a selected time period and to then again seek a navigation light.

Once a navigation signal pattern supplied by monitor 86 matches with one of the patterns supplied by memory 90, the corresponding sensor direction signal is supplied from comparator circuit 88 to vehicle control logic circuit 98. As a result, circuit 98 instructs drive 94 to rotate support 82 so that sensor 80 is pointing in the indicated direction. Circuit 98 then supplies signals to a selected one of mechanisms 104 and 106 and, if necessary, to drive motor 108 to cause the vehicle to travel forward and to turn toward the indicated direction. During such turning, support 82 can be caused to rotate at a rate corresponding to the rate at which the vehicle is turning in order to track the source of the identified navigation light. Alternatively, a further scanning procedure can be initiated.

As an alternative to driving and turning the vehicle after the direction to a desired navigation light has been determined, the vehicle can be halted and device 94 can be caused to rotate support 82 to scan for zone admission lights over an angular sector whose reference direction is the direction to the desired navigation light, which scan will be described in detail below.

After a navigation light source has been identified, and the vehicle may or may not have turned in order to head toward the source of that navigation signal light, the vehicle may be stopped and circuit 98 supplies signals to drive device 94 to cause sensor 80 to effect a scan from a direction 45°–50° to the left of the vehicle axis, or of the reference direction, to a direction 45°–50° to the right thereof, so that zone admission lights can be sensed. If a zone admission light pattern indicating a vacant zone is observed, the angular direction of the axis of light sensor 80 can be noted by circuit 102, in a manner similar to that performed by monitor 86, and a corresponding directional signal can be supplied to circuit 98 to rotate sensor 80 in the direction observed and to instruct the vehicle to turn so as to head in that direction.

If a vacant zone has not been observed, the vehicle can be stopped, and the above-described scanning can continue until the zone in front of the vehicle becomes vacant. As a general rule, the number of vehicles in motion in the system will be such that any given zone will become vacant after a relatively short period of time.

Alternatively, if a vacant zone has not been observed, scanning can be effected over a range of 135°–45° to the left. If a vacant zone is then found, signals are supplied to circuit 98 to instruct the vehicle to begin moving while turning to the left and to enter the zone which has been found to be vacant. If this scan does not indicate a vacant zone, a similar scan can be conducted to the right of the vehicle.

If the vehicle must turn to the left or right in order to find a vacant zone, the subsequent zone admission light scan, after the vehicle has entered the vacant zone, should be conducted in the direction to the right or left, respectively, of the current vehicle orientation to assure that the vehicle does not depart too far from its optimum path.

If all scans reveal only occupied zones, scanning for a vacant zone is repeated, starting from the beginning, until a vacant zone is noted.

In each case where the vehicle begins to move toward a vacant zone, it is turned to head approximately toward the zone admission light source. Then, during further advancing movement of the vehicle, scan can be performed from a direction 10° to the left to a direction 10° to the right, with the direction of the navigation light source being continuously noted and the direction of the vehicle then being adjusted to continue to head toward that light source.

If, during zone admission light scanning, two zone admission light signals each identifying a vacant zone are observed, the vehicle can be caused to respond to the zone admission light whose direction is closer to the direction of the navigation light which has been identified.

At about the time a vehicle crosses a zone barrier, it will leave the area of coverage of the zone admission light which is being observed. At this time, since each zone admission light source is located at the right-hand side of its associated zone, as viewed from the vehicle, the vehicle can be instructed to turn to the left by a selected angle, an angle of the order of 30° being suitable, and to travel a distance equal to approximately one-half the length of a zone side. This will bring the vehicle into the region of the center of the zone which it has just entered, thereby minimizing the danger of approaching a zone admission light support and assuring that the sensor 80 comes into the area of coverage of the zone admission lights of several adjacent zones.

Then a new search can be made for the highest priority navigation light signal visible to sensor 80, as described earlier.

According to a further possibility, scanning for a programmed navigation light source can be initiated as soon as the vehicle has passed beyond the area of the zone admission light beam toward which it has been heading.

It may also be acceptable, depending on the amount of vehicle traffic, to limit the search for a vacant zone to the quadrant directly in front of the vehicle, i.e. between lines 45° to the left and right of the reference direction, and to halt the vehicle until a zone in the scanning field is vacant.

If, after identifying a desired navigation light, no zone admission light is detected, the vehicle can be caused to head toward that navigation light while sensor 80 continuously scans the sector in front of the vehicle for a zone admission light. As soon as such a light is detected, movement of the vehicle relative to that light is controlled in the manner described above.

According to a further alternative operating procedure permitted by the system shown in FIG. 6, zone admission lights impinging on sensor 80 can be continuously monitored during navigation light acquisition so that the appropriate direction of vehicle travel can be selected as soon as the desired navigation light signal has been identified.

In the case of the second-mentioned embodiment, each zone has a fixed location and each zone admission light produces a beam pulse pattern identifying the location of its associated zone.

Referring again to FIG. 1, the zones can be arranged in a rectangular grid array so that each zone is located in a particular row R0–R5 and a particular column C0–C3 so that each zone is unambiguously identified by a combination of its row and column numbers.

Then, the light pulse pattern produced by each zone admission light 56 is selected, by properly programming the associated generator 50, to identify its associated zone.

By way of example, each light pulse pattern can consist of a beginning light pulse sequence followed by four light pulses coded to identify the zone row and four light pulses coded to identify the zone column. Each group of four light pulses can provide a binary representation of the associated row or column number, i.e. a short pulse representing the binary "0" value and a long pulse the binary "1" value.

The intervals between pulses can be varied between two values to indicate whether the zone is vacant or occupied.

With this system, whenever a light signal maximum has been located, circuit 102 will evaluate the duration of the intervals between successive pulses and circuit 86 will evaluate the binary values represented by successive light pulse groups following a beginning light pulse sequence.

Memory circuit 90 need be programmed only with the coordinates of the zone to which the vehicle is to travel and comparator 88 is constructed to store a representation of the coordinates of the zone last entered by the vehicle, which is normally provided by the light pulse pattern which was last evaluated and which identified a vacant zone.

Then, when a subsequent light pulse pattern is being evaluated, comparator 80 determines whether the zone with which it associates is in the direction of the destination zone.

With the above-described arrangement, this is a simple matter because it is only necessary to determine the differences between the row and column values of the destination zone and the row and column values of each of: the zone last entered and currently occupied by the vehicle; and the zone whose light pulse pattern is currently being evaluated.

If the row and column values are identified by successive binary signals, i.e. row R0 or column C0 by "0000", row R2 or column C2 by "0010" etc., then comparator 88 need only determine whether, for the zone whose light pulse pattern is currently being evaluated, the row value and the column value each differs from the corresponding value of the destination zone by an amount which is equal to or less than the difference between the corresponding values of the zone last entered and the destination zone.

For example, if the programmed destination is dock 8 at zone C0, R3, the signal identifying dock 8 is represented by:

| C0   | R3   |
|------|------|
| 0000 | 0011 |

If the vehicle is currently in zone C2, R1, the signal identifying that zone is represented by:

| C2 | R1 |
|----|----|

| 0010 | 0001 |
|------|------|

The difference Δ between those signals will be evaluated, in decimal terms, as $\Delta C_c = 2$, $\Delta P_c = 2$, where the subscript "c" denotes the zone presently occupied. The operative light sensor 80 is caused to perform a zone admission light scanning operation, as described previously, and if the vehicle is presently receiving a zone admission signal from zone C2, R2, which signal is represented by:

| C2   | R2    |
|------|-------|
| 0010 | 0010, | comparator 88 will determine that, with respect to the destination zone, $\Delta C_r = 2$ and $\Delta R_r = 1$. Here, the subscript "r" designates the zone from which a light signal is being received. Therefore, comparator 88 will determine that:

$\Delta C_r = \Delta C_c$ and $\Delta R_r < \Delta R_c$, and, if the light signal indicates that this zone is vacant, will instruct circuit 98 to propel the vehicle toward the light source presently being viewed. If the zone is occupied, circuit 98 will instruct device 94 to continue the scanning operation.

If the zone admission light signal being received is associated with zone C1, R1, the same result would occur; if the received light signal is associated with zone C3, R1, comparator 88 will indicate that the vehicle is not to travel toward that light source and is to continue scanning until a vacant zone closer to the destination is located.

As in the case of the first-described embodiment, when sensor 80 passes out of the area of coverage of the vacant zone admission light source toward which it is moving, to execute a turn to the left to travel toward the center region of the zone just entered.

In the case of either operating embodiment, a "zone occupied" signal from circuit 102 will always cause circuit 98 to stop the vehicle and to direct device 94 to initiate a scan for a different permitted direction of travel.

A "hazard proximity" signal from circuit 84 will always cause circuit 98 to instruct the vehicle to take the proper evasive action. At the same time, circuit 98 can instruct drive 94 to execute a scan over a suitable range to relocate the light signal currently being pursued, or to rotate in a direction opposite to, and by an amount equal to, the turning movement being executed by the vehicle to avoid the hazard.

Reverting to FIG. 2, each zone admission light beam is formed to impinge on a sensor 80 present in at least one-half of the zone adjacent that associated with the beam. However, the beam can be formed to be received over substantially more than one-half of the adjacent zone, it being desirable that the beam not impinge on the operative sensor 80 until the vehicle has fully centered the adjacent zone so that all zone admission beams of the adjacent zone are producing a "zone occupied" pattern.

Each zone admission beam is further formed so that it will cease to impinge on the operative sensor 80 of a vehicle before that vehicle has fully entered the associated zone; otherwise, the vehicle will be halted by the "zone occupied" pattern of the zone admission light signal associated with the zone which the vehicle is just entering and which was previously vacant.

Preferably, circuit 98 is constructed to cause the vehicle to continue traveling in its current direction if its operative sensor 80 is not receiving a zone admission light signal. This will assure that travel will continue even if the vehicle should pass through a small area which is not receiving a zone admission light beam, because of beam misalignment or other reasons.

Further, in systems employing separate navigation signal lights, each zone admission light could simply be turned off when its associated zone is vacant and could be actuated to produce a detectable signal pattern when the associated zone is occupied. Then the vehicle would be directed to the selected navigation light while continuously scanning for zone admission lights.

The described system would not prevent two vehicles from entering a zone via the same boundary substantially simultaneously. However, for most installations, such an occurrence is sufficiently unlikely that it will represent an acceptable risk.

The system according to the invention can serve to produce zone occupied signals when a zone is entered by an individual. Alternatively, suitable time delay circuitry could be provided to make the system insensitive to the short light barrier interruption produced by an individual.

It will be understood that the above description of the present invention is susceptible to various modifications, changes and adaptations, and the same are intended to be comprehended within the meaning and range of equivalents of the appended claims.

What is claimed is:

1. A system for effecting transport over a surface among a plurality of terminals, comprising
   at least one transport vehicle movable over the surface;
   barrier means for dividing the surface into a plurality of contiguous elemental zones, with respective pairs of the contiguous zones being separated by respective boundaries, and for sensing the passage of said vehicle across a boundary between two contiguous zones; light signal generator means for emitting light signals identifying each said zone which said vehicle is permitted to enter and identifying the location of each of the plurality of terminals;
   circuit means connected between said barrier means and said light signal generator means and responsive to passage of said vehicle across a respective boundary for controlling the light signals identifying those contiguous zones which are separated by that respective boundary;
   first photoelectric receiver means carried by said vehicle for sensing light signals produced by said light signal generator means and producing electrical signals representative of the light signals; and
   vehicle movement control means carried by said vehicle and connected to receive the electrical signals from said photoelectric receiver means for controlling the movement of said vehicle in dependence on the light signals.

2. A system as defined in claim 1 wherein said light signal generating means comprise light beam producing means for producing a plurality of independent light beams, each independent light beam being associated with one respective boundary being composed of light signals identifying one zone of the pair of zones separated by that respective boundary, and being directed toward a region in the other zone of that pair of zones for reception by said photoelectric receiver means when said vehicle is in such region.

3. A system as defined in claim 1 further comprising: a plurality of vertical supports carrying said light signal generator means and arranged to stand upright on the surface; hazard warning light source means mounted on each said support for directing a cone of light downwardly around each said support; and second photoelectric receiver means mounted on said vehicle for receiving light from said hazard warning light source means when present in such cone of light and connected to said vehicle movement control means for supplying electrical signals representative of the light received from said hazard warning light means for causing said vehicle to move in a manner to avoid the support enclosed by such cone.

4. A system as defined in claim 3 wherein said barrier means are carried by said supports.

5. A system as defined in claim 1 wherein said barrier means comprise a plurality of light barriers each producing a light beam aligned with a respective zone boundary.

6. A system as defined in claim 1 wherein said vehicle movement control means comprise: programmable memory means providing an electrical signal representative of a light signal identifying a selected terminal; and means connected to said memory means and said first photoelectric receiver means for comparing such signal with electrical signals produced by said first photoelectric receiver means for determining whether the light signal identifying the selected terminal is being received by said first photoelectric receiver means.

7. A system as defined in claim 1 wherein said first photoelectric receiver means comprise: a support member carried by said vehicle in a manner to be pivotable about a vertical axis relative to said vehicle; a light receiver having a directional characteristic with a maximum sensitivity in a given direction, mounted on said support member for movement therewith and with the directional characteristic of said light receiver oriented transversely to the axis of pivotal movement of said support member; means connected to said support member for causing said support member to execute a pivotal movement about the vertical axis; and movement monitoring means connected to said support member for monitoring the angular position of said given direction relative to said vehicle, and said vehicle movement control means comprise circuit means connected to said light receiver and said monitoring means for providing an indication of the direction of origin, relative to said vehicle, of a light signal received by said light receiver.

8. A system as defined in claim 1 wherein said at least one vehicle comprises a plurality of such vehicles each carrying a respective said photoelectric receiver means and vehicle movement control means.

9. A system as defined in claim 1 wherein a portion of the surface has an obstacle located in at least one zone and said light signal generator means emits a light signal which identifies each said zone in which such obstacle is located.

* * * * *